United States Patent [19]

Dogliani

[11] Patent Number: 4,964,670
[45] Date of Patent: Oct. 23, 1990

[54] FLEXIBLE HOOD FOR A CONVERTIBLE MOTOR VEHICLE, PROVIDED WITH ELEMENTS FOR COVERING RECESSES IN THE LID OF THE COMPARTMENT INTO WHICH THE HOOD IS FOLDED

[75] Inventor: Enrico Dogliani, Pecetto, Italy
[73] Assignee: Industrie Pinifarina S.p.A., Turin, Italy
[21] Appl. No.: 384,969
[22] Filed: Jul. 25, 1989

[30] Foreign Application Priority Data
Jul. 25, 1988 [IT]  Italy .............................. 53324/88[U]

[51] Int. Cl.$^5$ ............................................... B60J 7/20
[52] U.S. Cl. ................................................... 296/136
[58] Field of Search ................ 296/136, 107, 108, 116, 296/117

[56] References Cited

U.S. PATENT DOCUMENTS

| | | |
|---|---|---|
| 2,992,042 | 7/1961 | Gilson et al. .......................... 296/136 |
| 3,053,567 | 9/1962 | Geiger ................................... 296/107 |
| 4,799,729 | 1/1989 | Muscat .................................. 296/136 |
| 4,819,982 | 4/1989 | Eyb ....................................... 296/136 |

Primary Examiner—Robert R. Song
Attorney, Agent, or Firm—Christie, Parker & Hale

[57] ABSTRACT

The flexible hood (1) is movable between an extended position in which it covers the passenger compartment of the motor vehicle and a folded non covering position in which it is housed in a compartment (9) of the motor vehicle covered by a rigid lid (8). The lid (8) has recesses (12) at each end of its front edge (11) for avoiding interference between the lid (8) and the framework (2) of the hood (1), when the latter is unfolded.

The recesses (12) are provided with covering elements (13) movable between an extended position, assumed when the flexible hood (1) is folded in the compartment (9), and a retracted position assumed when the flexible hood is unfolded.

7 Claims, 3 Drawing Sheets

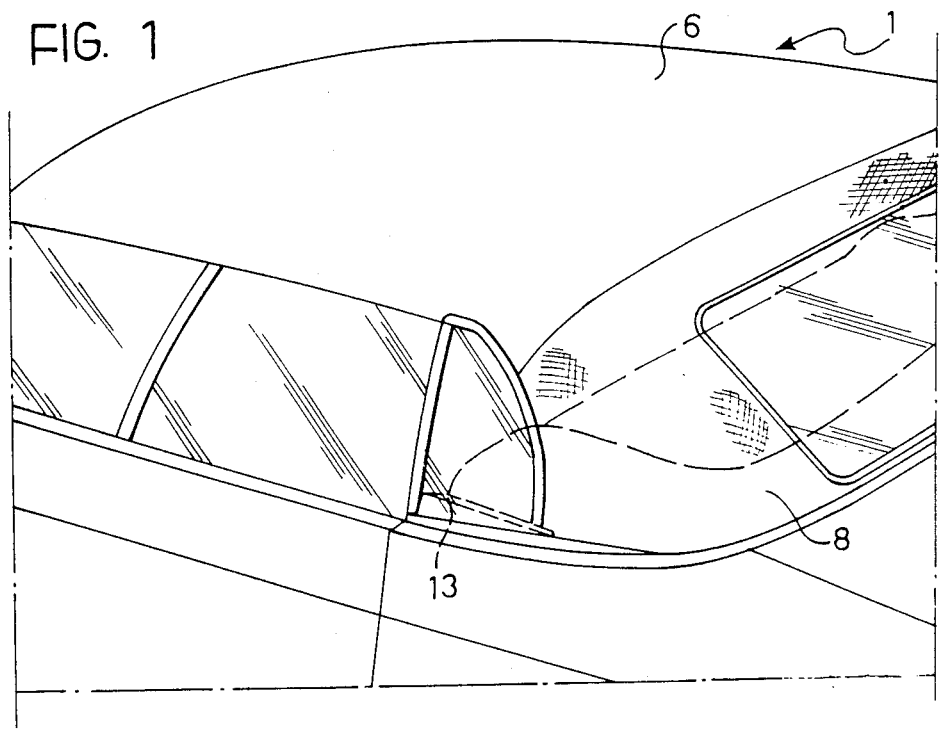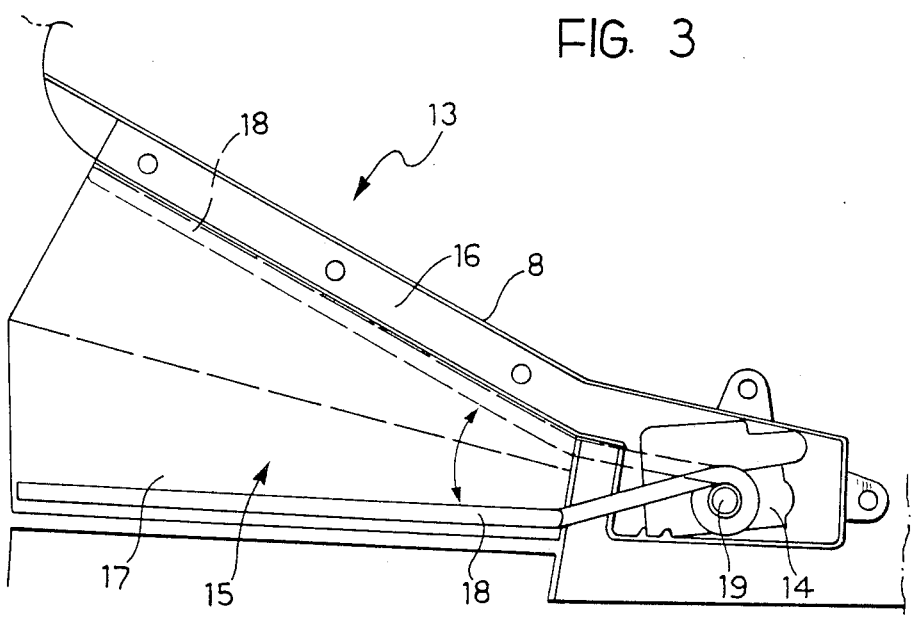

FLEXIBLE HOOD FOR A CONVERTIBLE MOTOR VEHICLE, PROVIDED WITH ELEMENTS FOR COVERING RECESSES IN THE LID OF THE COMPARTMENT INTO WHICH THE HOOD IS FOLDED

BACKGROUND AND SUMMARY OF THE INVENTION

The present invention relates to a flexible hood for convertible motor vehicles, which is movable between an extended position in which it covers the passenger compartment of a motor vehicle, and a folded, non-covering position in which it is housed in a compartment of the motor vehicle, the flexible hood comprising:

a pivoted framework including a rear arch articulated at its ends to the motor-vehicle body, a flexible fabric cover associated with the framework and connected at its rear edge to the arch, the compartment having a rigid lid for closing it both when the hood is folded in the compartment and when the hood is extended and the compartment is empty; the rigid lid being articulated at its rear edge to the motor-vehicle body and having a recess at each end of its front edge for avoiding interference between the lid and the end portions of the rear arch when the latter is pivoted to fold or unfold the hood while the lid is closed.

When a known hood of the type indicated is in its extended position, the rear arch, to whose central portion the rear end of the fabric is fixed, lies in a substantially horizontal position above the lid which closes the compartment. Only those portions of the arch adjacent its ends articulated to the motor-vehicle body lie beneath the plane of the lid in correspondence with the two recesses. In fact the side portions of the arch each take the form of an "S" of which the two end portions are arranged parallel to the lid, one above and the other beneath the latter, whilst the central portion is in a transverse position passing through the plane of the lid in correspondence with one of the recesses.

When the hood is to be folded, it is first of all necessary to raise the rear arch into a vertical position, releasing it from the lid which can thus in turn be raised into a vertical position, pivoting about its rear edge. The fabric cover and the framework of the hood are then folded into the compartment which is now open and finally the lid is closed, returning to the horizontal position.

In this position, the lid is exposed to the outside and the recesses in the ends of its front edge are therefore rather unattractive in appearance.

In order to avoid this problem, the present invention provides a hood of the type indicated above, characterised in that it includes an element for covering each recess in the rigid lid when the latter is closed, the covering element being movable between an extended position in which it covers the recess, and which it assumes when the hood is folded in the compartment, and a folded position in which the recess is at least partly uncovered and which it assumes when the hood is extended.

BRIEF DESCRIPTION OF THE DRAWINGS

Advantages and characteristics of the present invention will become clear from the detailed description which follows with reference to the appended drawings, provided by way of non-limiting example, in which:

FIGS. 1 and 2 are partial schematic perspective views of a motor vehicle provided with a hood according to the invention, in which the hood is shown in its extended position and in an intermediate position during the folding operation, respectively, FIG. 3 shows a detail of a hood according to the invention on an enlarged scale.

DETAILED DESCRIPTION OF THE PREFERRED EMBODIMENT

Figure 5:
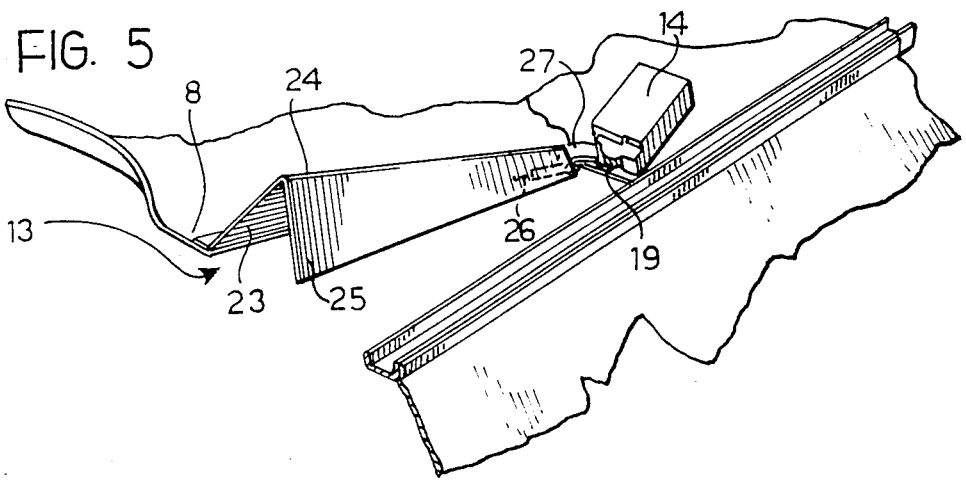
FIGS. 5 and 6 show a further embodiment of a detail of the hood according to the invention in two different positions, on an enlarged scale.
Figure 2:
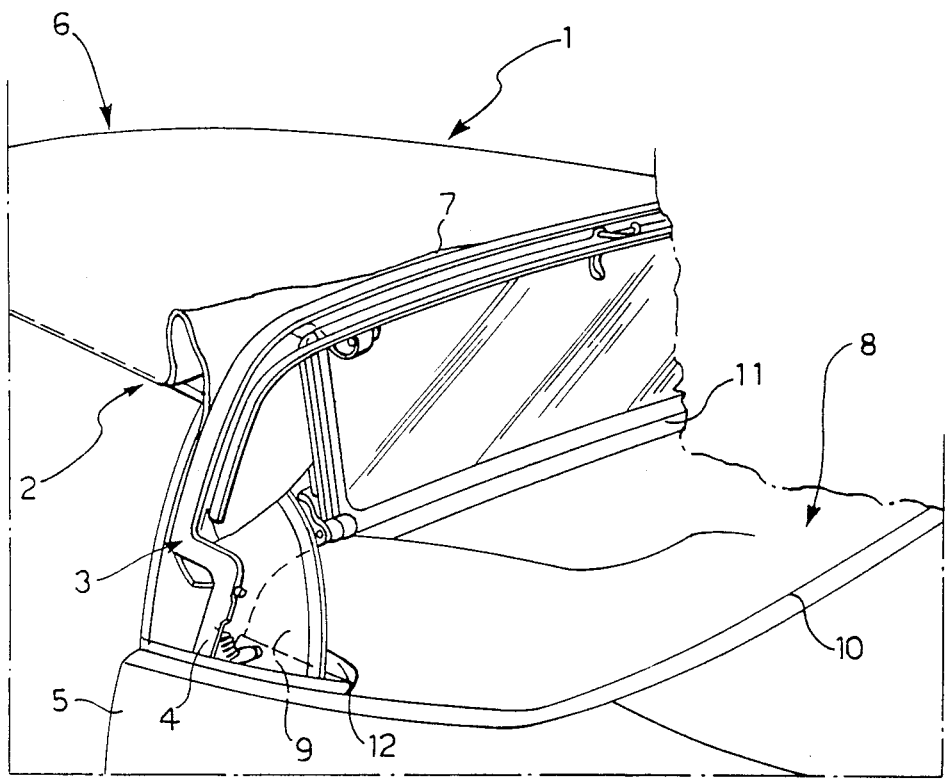
Figure 4:
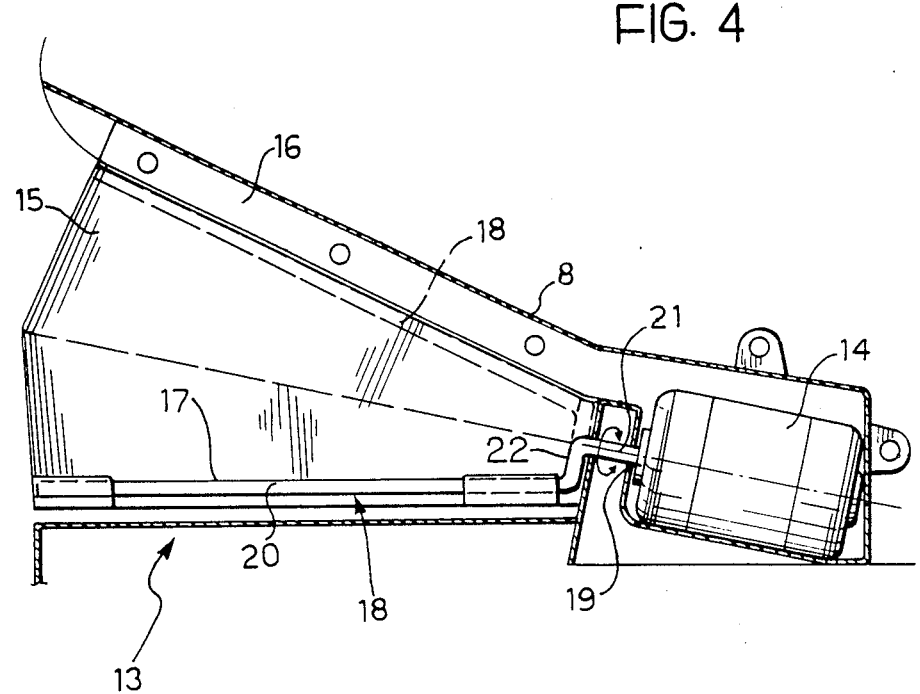
FIG. 4 shows another embodiment of a detail of the hood according to the invention on an enlarged scale.
Figure 6:
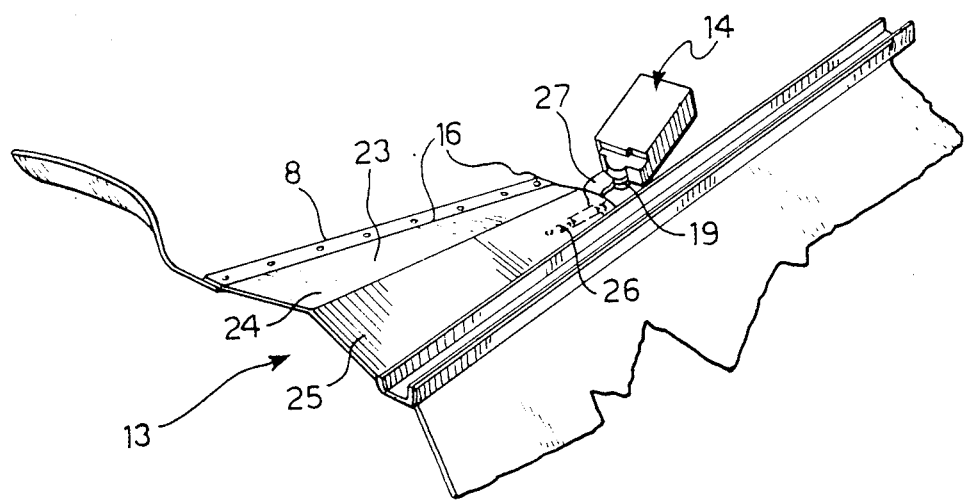

A flexible hood 1 for a convertible motor vehicle (FIGS. 1 and 2) comprises a pivoted framework 2, including a rear arch 3 which is articulated at its ends 4 to the body 5 of the motor vehicle, and a flexible fabric cover 6 associated with the framework 2 and having its rear edge 7 connected to the arch 3. The hood 1 is movable between an extended position in which it covers the passenger compartment of the motor vehicle, and folded, non-covering position, in which it is housed in a compartment 9.

These and other details of the hood which are not essential for an understanding of the present invention are described in detail in the Applicant's European patent application No. 246201 which is incorporated in the present specification by way of reference.

The compartment 9 has a rigid lid 8 for closing it both when the hood is folded within it and when the hood 1 is extended and the compartment 9 is empty. The lid 8 is articulated at its rear edge 10 to the body 5 and at each end of its front edge 11 has a recess 12 for avoiding interference between the lid 8 and the end portions 4 of the arch 3 when the latter is pivoted to unfold or fold the hood 1 while the lid 8 is closed.

Each recess 12 has a covering element 13 (FIGS. 3 to 6) which is movable by means of a motor 14 fixed to the lower face of the lid 8 between an extended position in which it covers the recess 12 and a folded position in which about half of the recess 12 is uncovered.

In a first embodiment (FIG. 3) and in a second embodiment (FIG. 4), the covering elements (13) each include a web 15 fixed by one edge 16 to the lid 8 of the motor vehicle and by its opposite edge 17 to a rod 18 driven by the motor 14.

In the first embodiment, the rod 18 is keyed perpendicularly to the shaft 19 of the motor 14 so that it rotates about the latter to cause the folding and unfolding of the web 15.

In the second embodiment, the rod 18 is constituted by two longitudinal portions 20, 21 connected by a transverse portion 22. The edge 17 of the web 15 is connected to the portion 20 of the rod 18 whilst the portion 21 is keyed to the shaft 19 of the motor 14, parallel thereto. The portion 20 of the rod 18 can therefore rotate about an axis defined by the drive shaft 19 to fold and unfold web 15.

In a third embodiment (FIGS. 5, 6), each covering element 13 includes a first rigid plate 23 fixed by one edge 16 to the lid 8 and hinged at its opposite edge 24 to a second rigid plate 25. The latter is connected to the shaft 19 of the motor 14 by means of a spring 26 fixed at one end to the lower face of the second rigid plate 25 and at its opposite end to a lever 27 connected to the shaft 19 of the motor 14. The motor rotates the lever 27 between the position of FIG. 6 (element 13 is unfolded) and that of FIG. 5 (element 13 is folded) in a plane substantially parallel to lid 8. This movement of lever 27 moves the opposite end of the spring about the one end fixed to the lower face of the second plate 25. In both FIGS. 5 and 6, the spring is at positions of relative extension, due to the rotation of the lever 27. As the lever 27 rotates, e.g., from the position of FIG. 6, the spring 26 moves through positions of relative compression and as the lever 27 approaches the position of FIG. 5, the spring 26 extends pulling the covering element 13 to the folded position. The same is true when the lever 27 moves from the position of FIG. 5 to that of FIG. 6, and thus element 13 unfolds.

In this case, the covering element is again movable between an extended position (FIG. 6), in which the two rigid plates 23, 24 cover the recess 12, and a folded position (FIG. 5) in which the latter are inclined to each other in correspondence with the hinge edge 24.

When the extended hood (FIG. 1) is to be folded, it is necessary first of all to raise the rear arch 3 into the vertical position (FIG. 2), releasing it from the lid 8 which can then in turn be raised into a vertical position, pivoting about its rear edge 10. The fabric 6 and the framework 2 of the hood 1 are then folded into the compartment 9, which is now open, and finally the lid 8 is closed and returns to the horizontal position.

During all these operations, about half the width of the recesses 12 are left uncovered since the covering elements 13 are in their folded positions. In fact, when the rear arch 3 is in its horizontal position, almost completely outside the lid 8, such an opening is sufficient to allow the side portions 4 of the arch 3 to pass through. When the latter is in motion, however, the two side portions 4 interfere with the folded covering elements 13 but this does not create problems since the covering elements 13 are hinged rigidly to the lid 8 only about their edges 16 about which they can pivot resiliently when thrust by the arch.

When the hood 1 has been folded and the lid 8 closed, the elements 13 are brought to their positions in which they cover the recesses 12 by means of the motors 14. The latter are governed by known control members, not illustrated, which ensure that they operate at the correct time.

This device prevents the recesses 12 of the lid 8 from appearing unattractive to an outside observer when the hood of the car is open and also improves the aerodynamic shape of the motor vehicle.

I claim:

1. A flexible hood (1) for a convertible motor vehicle, which is movable between an extended position in which it covers the passenger compartment of the motor vehicle and a folded, non-covering position in which it is housed in a compartment (9) of the motor vehicle, the flexible hood comprising:
    a pivoted framework (2) including a rear arch (3) articulated at its ends (4) to the motor-vehicle body (5),
    a flexible fabric cover (6) which is associated with the framework (2) and connected at its rear edge (7) to the arch (3), the compartment (9) having a rigid lid (8) for closing it both when the hood (1) is folded in the compartment (9) and when the hood (1) is extended and the compartment (9) is empty, the rigid lid (8) being articulated at its rear edge (10) to the motor-vehicle body (5) and having recesses (12) at each end of its front edge (11) for avoiding interference between the lid (8) and the end portions (4) of the rear arch (3) when the latter is pivoted to fold or unfold the hood (1) while the lid (8) is closed,
    the hood (1) being characterised in that for each respective recess of the recesses it includes an element (13) for covering the respective recess (12) in the rigid lid (8) when the lid is closed, the covering element (13) having one edge connected to the lid proximate the respective recess and having an opposite edge connected to a means for moving the covering element between an extended position in which it covers the respective recess (12) and which it assumes when the hood (1) is folded in the compartment (9) and a folded position in which the respective recess (12) is at least partly uncovered and which it assumes when the hood is extended.

2. A flexible hood according to claim 1, characterised in that the means for moving the covering element (13) includes a motor (14) which moves it from the extended position to its folded position and vice versa.

3. A flexible hood according to claim 2, characterised in that the means for moving further includes a rod, driven by the motor, and each covering element (13) comprises a web (15), the web being fixed at the one edge to the lid (8) and at the opposite edge (17) to the rod (18), the web (15) being movable between an extended position, in which the recess (12) is covered, and a folded position in which the rod (18) is brought into a position adjacent that of the edge (16) of the web (15) which is fixed to the lid (8), thus enabling the web (15) to pivot about its edge (16) which is fixed to the lid (8) when the web (15) is in contact with the portions (4) of the rear arch (3) when it is moving.

4. A flexible hood according to claim 3, characterised in that the motor (14) has a shaft (19) which is substantially perpendicular to the rod (18) and coupled to the rod such that the rod can rotate about the shaft (19) to fold and unfold the web (15).

5. A flexible hood according to claim 3, characterised in that the motor has a shaft (19) and the rod (18) has two longitudinal portions (20, 21) coupled by a transverse portion (22), the first longitudinal portion (2) carrying the opposite edge (17) of the web (15) and the second longitudinal portion (21) being keyed to the shaft (19) of the motor (14), parallel thereto, so that the first portion (20) can rotate about an axis defined by the second portion (21) to fold and unfold the web (15).

6. A flexible hood according to claim 2, characterised in that each covering element (13) comprises a first rigid plate (23) and a second rigid plate (25), the first rigid plate being fixed at one (16) of its edges to the lid (8) and hinged at its opposite edge (24) to the second rigid plate (25), the second rigid plate being connected to a shaft (19) of the motor (14) by means of a coupling mechanism, the covering element (13) being movable between an extended position in which the rigid plates (23, 25) cover the recess (12) and a folded position in which the rigid plates (23, 25) are inclined to each other about their hinged edge (24) and can pivot about the edge (16) of the first rigid plate (23) which is fixed to the lid (8) when the plates (23, 25) are in contact with the portions (4) of the moving arch (3).

7. A flexible hood according to claim 6, characterised in that the coupling mechanism includes a lever (27) and a spring (26) which is fixed at one end to the lower face of the second rigid plate (25) and at its opposite end to the lever (27) connected to the shaft (19) of the motor (14), the spring (26) enabling further displacement of the rigid plates (23, 25) when they are in contact with the portions (4) of the rear arch (3) when it is moving.

* * * * *

UNITED STATES PATENT AND TRADEMARK OFFICE
CERTIFICATE OF CORRECTION

PATENT NO. : 4,964,670
DATED : October 23, 1990
INVENTOR(S) : Enrico Dogliani It is certified that error appears in the above-identified patent and that said Letters Patent is hereby corrected as shown below:

On the title page:

[73] Assignee, change "Turin" to -- Torino --.

Column 4, line 40, after "portion" delete "(2)" and insert -- (20) --.

Signed and Sealed this

Fifth Day of May, 1992

*Attest:*

DOUGLAS B. COMER

*Attesting Officer*     Acting Commissioner of Patents and Trademarks